(12) United States Patent
Amir

(10) Patent No.: US 11,293,782 B2
(45) Date of Patent: Apr. 5, 2022

(54) INTRUSION DETECTING SENSORS AND METHOD

(71) Applicant: Essence Security International (E.S.I.) Ltd., Herzlia Pituach (IL)

(72) Inventor: Ohad Amir, Herzlia (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 0 days.

(21) Appl. No.: 15/604,893

(22) Filed: May 25, 2017

(65) Prior Publication Data

US 2017/0343379 A1 Nov. 30, 2017

Related U.S. Application Data

(60) Provisional application No. 62/341,660, filed on May 26, 2016.

(51) Int. Cl.
| | | |
|---|---|---|
| *G01D 5/14* | (2006.01) | |
| *G08B 13/08* | (2006.01) | |
| *G08B 13/184* | (2006.01) | |
| *G08B 13/24* | (2006.01) | |
| *G01D 5/26* | (2006.01) | |

(52) U.S. Cl.
CPC ............... *G01D 5/14* (2013.01); *G01D 5/26* (2013.01); *G08B 13/08* (2013.01); *G08B 13/184* (2013.01); *G08B 13/2494* (2013.01)

(58) Field of Classification Search
CPC ... G01D 5/14; G01D 5/26; G01D 5/28; G08B 13/08; G08B 13/183; G08B 13/184; G08B 13/187; G08B 13/19; G08B 13/2494; G08B 13/1481; G08B 13/189; G08B 13/1895; G08B 13/181; G08B 13/186; G08B 13/191; G08B 13/193
USPC ....... 324/207.11, 207.13; 340/517, 521, 522, 340/541, 545.1, 545.2, 545.3, 551, 552, 340/555, 556, 557, 547, 553
See application file for complete search history.

(56) References Cited

U.S. PATENT DOCUMENTS

| | | | |
|---|---|---|---|
| 4,746,906 A | 5/1988 | Lederer | |
| 4,857,912 A * | 8/1989 | Everett, Jr. ............ | G08B 19/00 340/508 |
| 4,940,967 A * | 7/1990 | Smith ................... | G08B 13/19 250/210 |
| 5,243,182 A * | 9/1993 | Murata ................ | H03K 17/943 250/221 |
| 5,912,619 A * | 6/1999 | Vogt ................... | G08B 13/1481 340/541 |

(Continued)

OTHER PUBLICATIONS

Communication Pursuant to Article 94(3) EPC dated Jun. 29, 2018 From the European Patent Office Re. Application No. 17172976.7. (3 Pages).

(Continued)

*Primary Examiner* — Steven L Yeninas

(57) ABSTRACT

A sensor unit comprising; a magnetic sensor adapted to detect a magnetic field; a light source adapted to transmit a radiation having a signature; a reflecting member for reflecting radiation emitted by the light source; a radiation sensor adapted to detect radiation reflected by the reflecting member; a controller adapted to generate a signal indicative of a security breach when the magnetic field is detected by the magnetic sensor and the signature is not identified in the radiation received by the radiation sensor.

17 Claims, 2 Drawing Sheets

(56) References Cited

U.S. PATENT DOCUMENTS

| | | | | |
|---|---|---|---|---|
| 5,936,522 A | * | 8/1999 | Vogt | G08B 13/08 340/501 |
| 6,838,655 B2 | * | 1/2005 | Heimlicher | H03K 17/941 250/221 |
| 7,123,145 B2 | * | 10/2006 | Reilly | G01S 13/56 340/552 |
| 7,714,718 B2 | * | 5/2010 | DiPoala | G08B 13/08 340/545.1 |
| 7,834,309 B2 | * | 11/2010 | Anderson | G08B 13/08 250/221 |
| 7,986,232 B2 | * | 7/2011 | Sharma | G08B 13/08 340/545.1 |
| 9,589,446 B1 | * | 3/2017 | Dey | G08B 13/08 |
| 10,605,653 B1 | * | 3/2020 | Dewitt, Jr. | G01J 1/44 |
| 10,706,703 B1 | * | 7/2020 | Barr | G08B 13/08 |
| 2004/0113779 A1 | * | 6/2004 | Iwasawa | G01V 8/12 340/545.3 |
| 2008/0284596 A1 | * | 11/2008 | Montague | E06B 9/01 340/545.8 |
| 2009/0015405 A1 | * | 1/2009 | DiPoala | G08B 13/183 340/556 |
| 2009/0026355 A1 | | 1/2009 | Anderson et al. | |
| 2009/0140858 A1 | | 6/2009 | Gore et al. | |
| 2010/0265069 A1 | * | 10/2010 | Michaels | G08B 13/08 340/572.3 |
| 2011/0057788 A1 | * | 3/2011 | Talkington | G08B 13/08 340/521 |
| 2012/0112910 A1 | * | 5/2012 | Meyers | G08B 13/08 340/547 |
| 2012/0268274 A1 | * | 10/2012 | Wieser | G08B 13/19606 340/545.2 |
| 2014/0240717 A1 | * | 8/2014 | Zhao | G01J 1/18 356/614 |
| 2016/0140817 A1 | * | 5/2016 | Beagley | G08B 13/19 340/555 |

OTHER PUBLICATIONS

European Search Report and the European Search Opinion dated Sep. 15, 2017 From the European Patent Office Re. Application No. 17172976.7. (9 Pages).

* cited by examiner

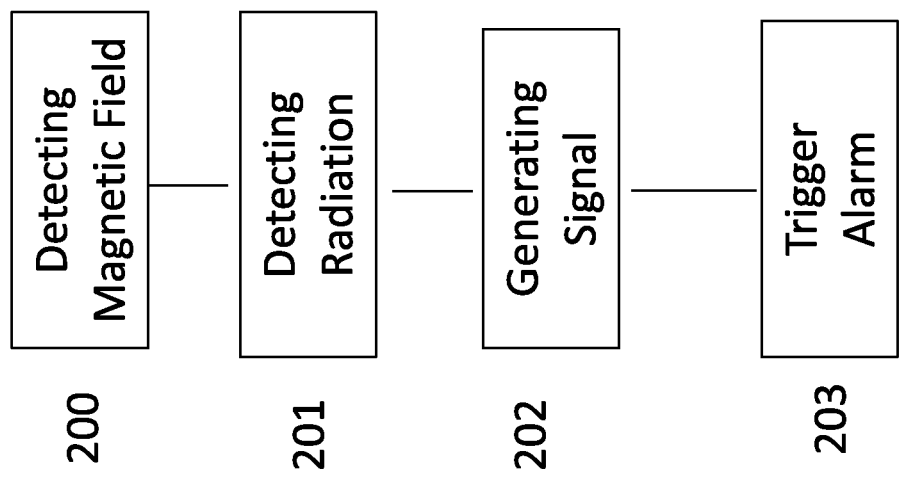

INTRUSION DETECTING SENSORS AND METHOD

RELATED APPLICATION

This application claims the benefit of priority under 35 USC 119(e) of U.S. Provisional Patent Application No. 62/341,660 filed on May 26, 2016, the contents of which are incorporated herein by reference in their entirety.

FIELD AND BACKGROUND OF THE INVENTION

The present invention, in some embodiments thereof, relates to sensors for security systems, more particularly, but not exclusively, to magnetic sensing systems and methods for intrusion detection.

Conventional door and window sensors in security systems contain a magnet which may be included within a first housing, and a magnetic sensor (also referred to herein as "sensor") which may be included within a second housing. One of the magnets (or the first housing) and the magnetic sensor (or the second housing) is mounted on the door or window (entrance closure) being monitored and the other is mounted on the doorjamb or windowsill associated with the entrance closure being monitored. The magnetic sensor may provide binary output, i.e. whether or not magnetic field is sensed, or a value indicting intensity of a magnetic field. A processor may receive the output from the sensor and determine whether the opening is open or close.

When the entrance closure is closed and the magnet is in close proximity to the sensor, the switch produces an output signal that may be interpreted by the processor that the door is in its closed position. Once the entrance closure is opened the magnet is not in close proximity to the sensor, the switch produces an output signal that that may be interpreted by the processor that the door is not in its closed position.

As the magnetic field is disrupted, when unauthorized entry occurs, the signal sent to the processor is changed. The processor may then trigger the alarm. However, a magnetic detector may be disabled by, e.g., using another magnet on the other side of an access point, thus attempting to unlawfully open the window without activating the alarm.

SUMMARY OF THE INVENTION

According to one of its aspects, the present invention provides a sensor unit. The sensor unit comprising; a magnetic sensor adapted to detect a magnetic field; a light source adapted to transmit a radiation having a signature; a reflecting member for reflecting radiation emitted by the light source; a radiation sensor adapted to detect radiation reflected by the reflecting member; a controller adapted to generate a signal indicative of a security breach when the magnetic field is detected by the magnetic sensor and the signature is not identified in the radiation received by the radiation sensor.

According to another of its aspects, the present invention provides a sensor unit comprising a magnet; a magnetic sensor adapted to detect a magnetic field in proximity of a magnet; a light source adapted to transmit a radiation having a signature; a reflecting member for reflecting radiation emitted by the light source; a radiation sensor adapted to detect radiation reflected by the reflecting member; a controller adapted to generate a signal indicative of a security breach when the magnetic field is detected by the magnetic sensor and the signature is not identified in the radiation received by the radiation sensor.

In some embodiments, the sensor unit wherein the controller is further adapted to generate a second signal indicative of another security breach when magnetic field is absent or change in the magnetic field is sensed, and the radiation sensor receives radiation different than the radiation signature.

In some embodiments, the sensor unit wherein the second signal or an action associated with the second signal is delayed.

In some embodiments, the sensor unit wherein the light source transmits a radiation signature at a predetermined frequency.

In some embodiments, the sensor unit wherein the light source is an infrared (IR) light source or light emitting diode (LED).

In some embodiments, the sensor unit wherein the magnetic sensor comprises a magnet located on a first member of the element.

In some embodiments, the sensor unit wherein a change in the received radiation or in the magnetic field corresponds to change in proximity between a first part of the element and a second part of the element.

In some embodiments, the sensor unit wherein the light source and the radiation member are located on one part of the element, and the reflecting member is located on a different member of the element.

In some embodiments, the sensor unit further comprising tampering detection systems selected from: vibrational sensing systems, gravitational sensing systems and motion sensing systems.

In some embodiments, the sensor unit wherein the element is selected from a door and window.

In some embodiments, the sensor unit further comprising a filter for intercepting a portion of the radiation emitted from the light source.

In some embodiments, the sensor unit further comprises at least one of: a repeater, lens, mirror and a directional antenna.

According to one of its aspects, the present invention provides method of sensing a security breach in an element, the method comprising: detecting a magnetic field; detecting radiation; generating a signal indicative of a security breach when said magnetic field is detected and the radiation is different than a known radiation signature.

According to one of its aspects, the present invention provides method of sensing a security breach in an element, the method comprising: detecting a magnetic field in proximity of a magnet; detecting radiation; generating a signal indicative of a security breach when said magnetic field is detected and the radiation is different than a known radiation signature.

In some embodiments, the method further comprising generating a second signal indicative of another security breach of an element when magnetic field is absent or change in the magnetic field is sensed, and the radiation sensor receives radiation different than the radiation signature.

In some embodiments, the method wherein the second signal or an action associated with the second signal is delayed.

In some embodiments, the method wherein the radiation signature comprises intermittently emitted radiation.

In some embodiments, the method wherein the detection of radiation signature is for infrared radiation.

In some embodiments, the method wherein a light emitting diode (LED) provides the radiation signature.

In some embodiments, the method wherein the radiation is reflected by a repeater or a mirror.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 shows a flow diagram of a method of detecting intrusion, using the sensor unit depicted in FIG. 1, according to some embodiments of the present invention.

DESCRIPTION OF SPECIFIC EMBODIMENTS OF THE INVENTION

Figure 1:
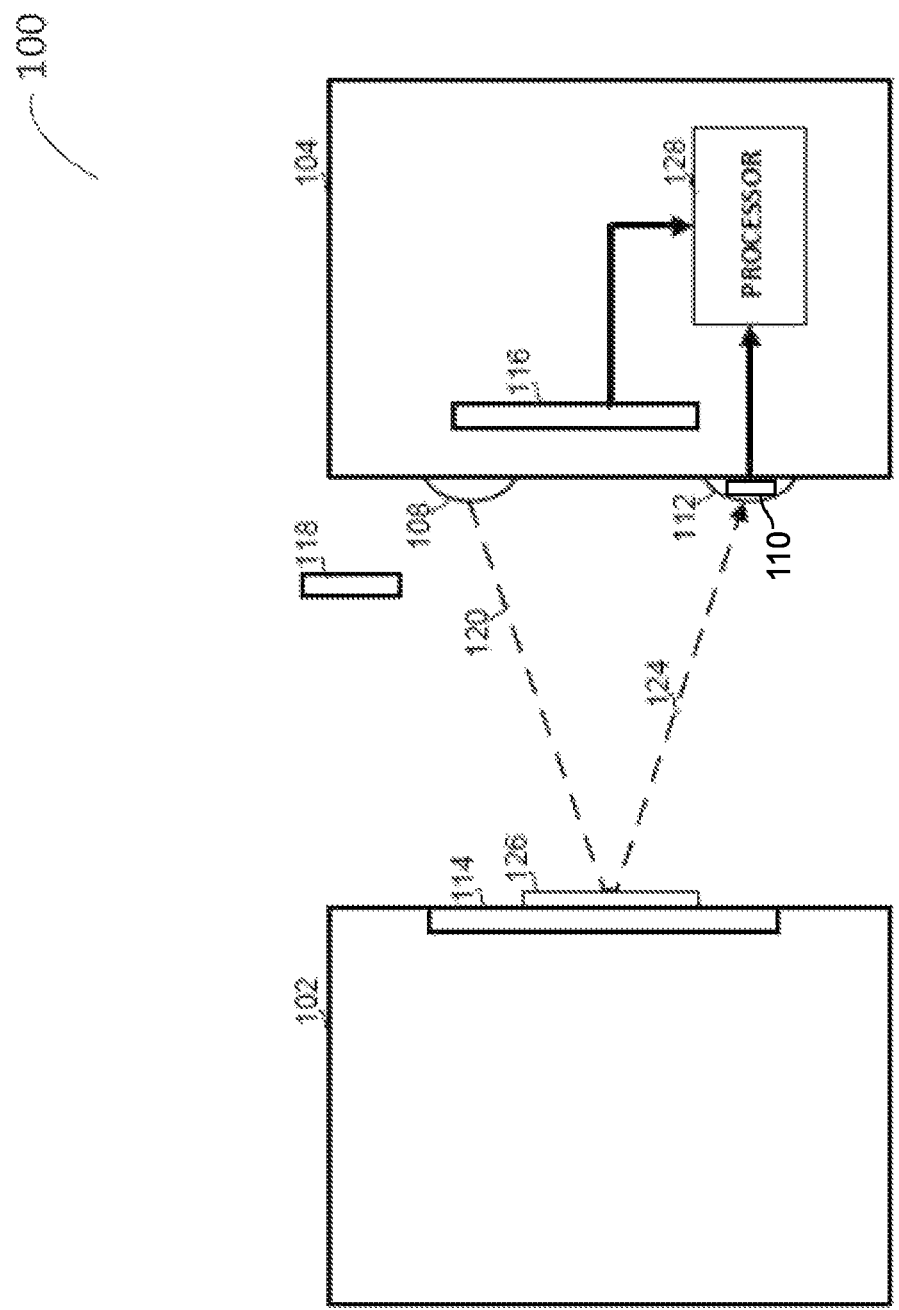
FIG. 1 is a schematic illustration of a sensor unit, according to some embodiments of the present invention.

The present invention, in some embodiments thereof, relates to sensors for security systems, and more particularly, but not exclusively, to magnetic sensing systems and methods for intrusion detection.

Magnetic intrusion detectors typically utilize a magnet, e.g., ferromagnetic material, and a magnetic sensor, positioned in alignment on a movable object for which prevention of its intrusion is desirable, such as a door, window or the like, and its proximate stationary frame. The magnetic sensor can be coupled to or otherwise communicate with a processor, for determining whether a signal provided by the sensor indicates open or closed opening. In a typical alignment of paired elements, magnetic coupling occurs between the magnet and the magnetic sensor. When the protected door, window or the like is closed, this alignment produces a magnetic coupling and the sensor detects magnetic field, interpreted as closed window or door. When the door or window is opened, the magnetic coupling between the element pairs is disturbed and the magnetic sensor produces output signals interpreted by the processor as the opening was opened.

Nonetheless, intrusion magnetic detectors may be unreliable since they are relatively easy to defeat as intruders employ external magnets or other apparatus placed near the proximal to the sensor, thus facilitating opening the door or window without disturbing the magnetic properties of the magnetic sensor and without firing an alarm. It is thus required to immune magnetic sensors to these types and other types of intrusion attempts.

Other prior systems have attempted to discriminate between false alarms and unauthorized entry by requiring that the magnet-to-sensor unit distance vary for more than a predetermined period of time. Such prior art systems require that a fault condition has a long duration before an alarm is triggered, which are complex and suffer from disadvantages such as requiring increased energy and optionally manual operation of the system.

The present invention provides an apparatus comprising a sensor unit utilizing a magnetic sensor for detecting a magnetic field change, coupled to a radiation sensor. Both sensors can be connected or otherwise coupled to a processor for determining, based on received signals, whether the opening is closed or open, and provide an indication of a tamper attempt.

This is achieved according to some embodiments of the present invention, by utilizing a first signal output received from a magnetic sensor for detecting a magnetic field, and a second signal output received from a radiation sensor for detecting an absence in a radiation signature.

If the magnetic sensor produces a signal interpreted by the processor to indicate an open window or door, and the radiation sensor detects a deficiency in an expected radiation signature, this may indicate an intrusion attempt but may also occur due to a legitimate user, such as a house owner, opening the door or window without turning the alarm system off first.

The sensor unit may also mitigate false alarms. As such, tampering with the magnetic sensor, e.g., by bringing into close proximity an additional magnet, may result in no change or sufficiently small change in the magnetic field. However, a change in the radiation may indicate not only that the door or window have been opened, but also that the magnetic sensor has been tampered with.

Element 100, for which detection of intrusion is desired, e.g., a window or door, comprising at least two members 102 and 104 is shown in FIG. 1. Member 102 can be a movable part such as window or a door or another opening, while member 104 can be fixed, such as windowsill or doorjamb, respectively. However, member 102 may be fixed while member 104 is movable. In some embodiments of the invention, member 102 can comprise a magnet 114, and member 104 may comprise a magnetic sensor 116 adapted to detect a magnetic field when in close proximity to magnet 114 or another magnet. Magnetic sensor 116 can be a read switch, a hall effect, an AMR, a GMR, or any other magnetic sensor. Thus, magnetic member 114 and magnetic sensor 116 are spaced in close proximity from one another and defined by a distance therebetween to provide magnetic coupling when the opening is closed. Magnetic sensor 116 outputs a signal indicating whether or not magnetic field is sensed, or a value indicating its intensity.

Member 104 can also comprise processor 128 for receiving input from magnetic sensor 116 and from radiation sensor 112, as will be further detailed below.

According to some embodiments, magnetic sensor 116 may be tampered by bringing into its close proximity an additional magnet 118, as shown in FIG. 1, thus rendering magnetic sensor 116 with a similar magnetic field that allows magnetic sensor 116 to output having a similar value as if it was in proximity to magnet 114.

Thus, it is an object of the present invention to provide a sensor unit for detecting tampering when replacing a magnet being a part of the sensor unit with a different magnet or when adding an additional magnet.

In some aspects of the present invention, there is provided a sensor unit comprising; a magnetic sensor 116 adapted to detect a magnetic field; a light source 108 adapted to transmit a radiation having a signature 120; a radiation sensor 112 adapted to detect the received radiation 124; and a controller 128 adapted to generate a signal indicative of a security breach when the magnetic field is detected by the magnetic sensor 116 and the signature is not identified in the radiation received by the radiation sensor 112.

In some embodiments of the present invention, the sensor unit comprising a magnet 114; a magnetic sensor 116 adapted to detect a magnetic field change; a light source 108 adapted to transmit a radiation having a signature 120; a reflecting member for reflecting radiation emitted by the light source; a radiation sensor 112 adapted to detect radiation reflected 124 by the reflecting member 126; and a controller 128 adapted to generate a signal indicative of a security breach when the magnetic field is detected by the magnetic sensor 116 and the signature is not identified in the radiation received by the radiation sensor 112.

Magnetic member 114 may comprise a reflecting member 126 or may have a portion thereon that is reflective for reflecting radiation 124 emitted by light source 108 to radiation sensor 112.

Light source 108 and radiation sensor 112 may be attached to a part 104 of an element for which detection of intrusion is desired, or to a magnetic sensor 116. Alternatively, light source 108 and radiation sensor 112 may be attached to member 102. According to some embodiments, radiation sensor (or radiation detector) 112 is adapted to detect radiation reflected by reflecting member 126 or reflective material associated with the magnet 114. Change in the mutual position between part 104 and part 102 renders a radiation signature indicative of the change, which may be due to opening the window or door.

When magnetic sensor 116 indicates a magnetic field similar to when the opening is closed, and radiation sensor 112 indicates that the expected radiation signature is received, the opening may be assumed to be closed. A controller 128 may receive a first signal indicative of the radiation signature and/or a second signal indicative of the magnetic field sensed.

The controller 128 may determine when the door or window has been moved, for example, for at least a predetermined delay period, and may provide a signal in response thereto, for example, an signal triggering an alarm.

It is appreciated that controller 128 may be provided by a variety of mechanisms including a mechanical controller, a microprocessor or microcontroller. In some embodiments, the functionality of controller 128 is provided by a processor, e.g., a microprocessor.

In some embodiments of the present invention, the first signal and the second signal may be received simultaneously.

When both sensors indicate that the opening is open, an alarm may be triggered. However, this may also occur when a legitimate user has opened the opening but failed to disarm the system first. Thus, a delay in firing the alarm may be taken, to allow the legitimate user to disarm the system.

If magnetic sensor 116 provides a signal interpreted as a closed opening, while the signal output by radiation sensor 112 indicates that the opening is open, for example, an expected radiation signal is not received, this combination may indicate intentional tampering with the window by placing a magnet near magnetic sensor 116, and an immediate alarm may be fired, or any other action may be taken, such as calling a person, a call center, a police or the like.

Thus, if the sensor is tampered with by contacting magnetic sensor 116 or nearby magnetic sensor 116 with an additional magnet 108, while parts 102 and 104 are spaced apart from one another, an indication of the received radiation signature or of change in radiation signature (receiving radiation or not receiving radiation) may be provided, corresponding to indication of tampering.

Another object of the invention is to reduce power consumption of a sensor unit. This may be achieved, according to some embodiments, by utilizing a light emitting diode (LED) as the light source 108. As such, the light source 108 and the radiation sensor 112 may be operated at a low power consumption rate, thus, saving energy. Additionally or alternatively, light source 108 can be designed to emit light intermittently, for example, for 10 milliseconds every 100 milliseconds, or any other duration and interval combination. Controller 128 can then be adapted to interpret lack of radiation or change in radiation as an open window or door only during the time periods when light source 108 emits radiation, e.g., light. However, the disclosure is not be restricted to a specific light source 108 or specific lighting scheme, and any other light source for emitting light at a desired frequency, duration, intensity or another characteristic or scheme of a radiation signature, is suitable in accordance with some embodiments of the invention.

In some embodiments, the source for transmitting a radiation signature on the magnet may be any radiation source, for example, a radio frequency (RF) source, an infrared (IR) source.

As mentioned above, radiation 120 is emitted by radiation source 108 reflective member 126, for example, magnet 114 may have a member made of reflective material disposed thereon, may comprise a reflective material, or may be attached to a reflective material. The radiation 120 may be reflected 124 by the reflective member 126. Magnet 114 or reflecting member 126 may be connected via a repeater, such that generally a majority of the radiation 120 is transmitted via the repeater to the reflecting member 126. In some embodiments, the reflecting member 126 may be connected to a mirror.

In some embodiments, reflecting member 126 may comprise an antenna for reflecting electromagnetic waves to radiation sensor 116. Reflecting member 126 may be connected to the magnetic sensor 116 for redirecting radio frequency (RF) energy, or can be integrated as part of an antenna assembly. Antenna may reflect the incoming radiation back to the direction from which it came, for example, via a mirror or a repeater. In some embodiments, the reflecting member 126 comprises a directional antenna.

In some embodiments, magnetic sensor 116, light source 108 and radiation sensor 112 consume energy. However, as described above, this energy consumption may be minimal such that it can be supplied by a battery that needs seldom replacement.

In some embodiments, light sensor 112 may further comprise a filter 110 for intercepting a portion of the radiation emitted from the light source 108.

In some embodiments, the sensor unit may further comprise or be attached to a tampering detection system selected from: vibrational sensing systems, gravitational sensing systems and motion sensing systems for providing other relevant information, e.g., regarding breaching of an object, sensing vibrations or motions, when for example, destroying a wall, breaking glass of a window, etc.

According to some embodiments, there is provided a method of sensing a security breach in an element 200, such as a door or window, as depicted in FIG. 2. The method 200 comprising detecting a magnetic field 201, detecting radiation 202, generating a signal 203 indicative of a security breach when said magnetic field is detected and the radiation is different than a known radiation signature. In some embodiments, the radiation is reflected 124 from the radiation source 108 on a radiation sensor 112. In some embodiments, when the signal is generated, an alarm is triggered 204.

In some embodiments there is provided a method of sensing a security breach in an element 200, the method comprising detecting a magnetic field 201 in proximity of a magnet 114, and detecting the radiation reflected 202 from the radiation source 108 on a radiation sensor 112. The method further comprises generating a signal 203 indicative of a security breach when said magnetic field is detected and the radiation is different than a known radiation signature. In some embodiments, when the signal is generated, an alarm is triggered 204.

When both signals generated indicate that the opening is open, an alarm may be triggered. A delay in firing the alarm may be taken, which may also occur when a legitimate user has opened the opening but failed to disarm the system first, to allow the legitimate user to disarm the system, If a signal provided as a result of change in magnetic field is interpreted as a closed opening, while the signal output by radiation sensor 112 indicates that the opening is open, for example, an expected radiation signal is not received, this combination may indicate intentional tampering with the window by placing a magnet near magnetic sensor 116, and an immediate alarm may be triggered.

As such, if the sensor is tampered with when parts 102 and 104 are spaced apart from one another, a state of change in radiation signature (receiving radiation or not receiving radiation) may be provided, corresponding to indication of tampering, e.g., by contacting a magnetic 114 or magnetic sensor 116 with an additional magnet 108.

In some embodiments, the radiation sensor 112 detects radiation 124 received from the reflecting member 126 at intervals of at most 30 seconds, preferably 1-5 seconds. As such, the radiation sensor 112 may be applied intermittently, i.e., may detect radiation received from the reflecting member 126 at a predetermined time frame and interval, intermittently, to save power by generating about at most 500 mW, preferably about at most 200 mW, about at most 100 mW, most preferably about at most 50 mW.

In some embodiments, the radiation sensor 112 may comprise a LED and may further comprise photodiode, e.g., infrared photodiode. The LED emits light on a magnet, e.g., magnet 114, and the light or a portion of the light is reflected on a magnetic sensor 108 and the photodiode receives the light.

The signal may be collected by a controller 128, for example, a microprocessor for generating the signal indicative of a security breach. Controller 128 may pull the signal intermittently, and as such may save energy due to discontinuous pulling of the signal. Controller 128 can then be adapted to interpret lack of radiation or change in radiation as an opened window or door only during the time periods when radiation source 108 emits radiation, e.g., light. Processor 128 may trigger an alarm when a security breach is indicated.

In some embodiments, the method further comprises generating a second signal indicative of another security breach of an element when magnetic field is absent or change in the magnetic field is sensed, and the radiation sensor receives radiation different than the radiation signature.

In some embodiments, the radiation signature is infrared radiation.

In some embodiments, the radiation signature is provided by a light emitting diode (LED).

In some embodiments, the radiation signature is reflected by a repeater or a mirror, and a majority of the radiation 120 is transmitted via the repeater to the reflecting member 126 to reflect electromagnetic waves to the radiation sensor 116. In some embodiments, the reflecting member 126 may comprise an antenna for reflecting electromagnetic waves. The reflecting member 126 may be connected to the magnetic sensor 116 for redirecting radio frequency (RF) energy, or can be integrated as part of an antenna assembly. Antenna may reflect the incoming radiation back to the direction from which it came, for example, via a mirror or a repeater. In some embodiments, the reflecting member 126 comprises a directional antenna.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A sensor unit comprising:
   a first part, comprising:
      a reflecting member for reflecting radiation emitted by a light source, and
      a magnet; and
   a second part, comprising:
      a magnetic sensor adapted to detect a magnetic field,
      said light source, adapted to transmit a radiation having a signature,
      a radiation sensor adapted to detect radiation reflected by the reflecting member, and
      a controller adapted to identify tampering using an additional magnet, in response to the magnetic field being detected by the magnetic sensor and the signature being not identified in radiation received by the radiation sensor and to identify a security breach not caused by tampering using an additional magnet in response to the magnetic field not being detected by the magnetic sensor and the signature being not identified in radiation received by the radiation sensor;
   wherein the controller is to generate a signal based on said identification, causing an action be taken selected from the group consisting of: fire an alarm; call a person; call a call center; and call a police, wherein in response to the magnetic field being detected by the magnetic sensor and the signature being not identified in radiation received by the radiation sensor the action is caused to be taken immediately, and in response to the magnetic field not being detected by the magnetic sensor and the signature being not identified in radiation received by the radiation sensor the action is caused to be taken in delay allowing a legitimate user to abort the action.

2. The sensor unit according to claim 1, wherein the controller is further adapted to generate a second signal, indicative of another security breach, when magnetic field is absent, and the radiation sensor receives radiation different than the radiation signature.

3. The sensor unit according to claim 1, wherein the light source transmits a radiation signature at a predetermined frequency.

4. The sensor unit according to claim 1, wherein the light source is an infrared (IR) light source or light emitting diode (LED).

5. The sensor unit according to claim 1, further comprising tampering detection systems selected from: vibrational sensing systems, gravitational sensing systems and motion sensing systems.

6. The sensor unit according to claim 1, wherein the sensor unit is installed at a door or a window, wherein one of the first and second part of said sensor unit is installed at the door or window, and the other of the first and second part of said sensor is installed on a frame of the door or window.

7. The sensor unit according to claim 1, further comprising a filter for intercepting a portion of the radiation emitted from the light source.

8. The sensor unit according to claim 1, further comprising at least one of: a repeater, lens, mirror and a directional antenna.

9. The sensor unit according to claim 1,
   wherein the radiation sensor is controlled to detect radiation at a predetermined time frame and interval, and wherein the radiation sensor is applied only during time periods when the radiation is being transmitted.

10. The sensor unit according to claim 9, wherein the controller is further adapted to generate a second signal indicative of another tamper when magnetic field is absent or change in the magnetic field is sensed, and the radiation sensor receives radiation different than the radiation signature, wherein the second signal or an action associated with the second signal is delayed.

11. The sensor unit according to claim 1, wherein the radiation is transmitted intermittently and wherein the controller is adapted to pull a detected radiation signal from said radiation sensor only during time periods when the radiation is being transmitted.

12. The sensor unit according to claim 1, wherein signal indicative of tampering is generated in response to the magnetic sensor providing a signal interpreted by the controller as a closed opening while the signal output by the radiation sensor is interpreted by the controller as an open opening.

13. A method of sensing a security breach in an element, the method comprising:
   detecting a magnetic field by a magnetic sensor installed in a second part of a sensor unit, wherein a magnet is installed in a first part of said sensor unit;
   transmitting a radiation having a signature, by a light source installed in said second part of said sensor unit;
   detecting, by a radiation sensor, installed in said second part of said sensor unit, radiation reflected by a reflecting member installed in a first part of said sensor unit;
   identifying tampering using an additional magnet, in response to said magnetic field being detected by the magnetic sensor and the signature being not identified in radiation received by the radiation sensor and identifying a security breach not caused by tampering using an additional magnet in response to the magnetic field not being detected by the magnetic sensor and the signature being not identified in radiation received by the radiation sensor; and generating a signal based on said identifying causing an action be taken selected from the group consisting of: fire an alarm; call a person; call a call center; and call a police, wherein in response to the magnetic field being detected by the magnetic sensor and the signature being not identified in radiation received by the radiation sensor the action is caused to be taken immediately, and in response to the magnetic field not being detected by the magnetic sensor and the signature being not identified in radiation received by the radiation sensor the action is caused to be taken in delay allowing a legitimate user to abort the action.

14. The method according to claim 13, further comprising generating a second signal indicative of another security breach, when magnetic field is absent, and the radiation sensor receives radiation different than the radiation signature.

15. The method according to claim 13, wherein signal indicative of tampering is generated in response to the magnetic sensor providing a signal interpreted by the controller as a closed opening while the signal output by the radiation sensor is interpreted by the controller as an open opening.

16. A security system configured to perform the method of claim 13.

17. The security system according to claim 16, wherein the system is further adapted to generate a second signal, indicative of another security breach, when magnetic field is absent, and the radiation sensor receives radiation different than the radiation signature.

\* \* \* \* \*